United States Patent
Ozeki et al.

(10) Patent No.: US 6,991,027 B2
(45) Date of Patent: Jan. 31, 2006

(54) AUTOMOTIVE AIR CONDITIONER

(75) Inventors: Yukio Ozeki, Tochigi (JP); Masaharu Onda, Tochigi (JP); Hidenobu Arakawa, Tochigi (JP); Ryoichi Tochigi, Tochigi (JP)

(73) Assignee: Calsonic Kansei Corporation, Tokyo (JP)

( * ) Notice: Subject to any disclaimer, the term of this patent is extended or adjusted under 35 U.S.C. 154(b) by 261 days.

(21) Appl. No.: 10/088,000

(22) Filed: Mar. 5, 2002

(65) Prior Publication Data

US 2002/0129933 A1    Sep. 19, 2002

(30) Foreign Application Priority Data

Mar. 16, 2001 (JP) .............................. 2001-076991

(51) Int. Cl.
*B60H 1/00*    (2006.01)

(52) U.S. Cl. .................... 165/203; 165/42; 165/43; 454/156; 454/160; 454/161; 237/12.3 A; 237/12.3 B

(58) Field of Classification Search ............... 165/42, 165/43, 203; 454/156, 160, 161; 237/12.3 A, 237/12.3 B
See application file for complete search history.

(56) References Cited

U.S. PATENT DOCUMENTS 5,988,263 A    11/1999 Schwarz 6,019,163 A    2/2000 Saida et al.

FOREIGN PATENT DOCUMENTS

| DE | 36 35 246 A1 |   | 4/1988 |
|----|----|----|----|
| DE | 195 39 850 A1 |   | 4/1997 |
| JP | 9-328008 | * | 12/1997 |
| JP | 9-328011 | * | 12/1997 |
| JP | 10-278544 | * | 10/1998 |
| JP | 11-1114 | * | 1/1999 |
| JP | 11-5431 | * | 1/1999 |
| JP | 11198636 A | * | 7/1999 |
| JP | 11-227442 | * | 8/1999 |
| JP | 11-254942 | * | 9/1999 |
| JP | 2000-52745 | * | 2/2000 |
| JP | 2000-108636 | * | 4/2000 |
| JP | 2000-272327 | * | 10/2000 |

* cited by examiner

*Primary Examiner*—John K. Ford

(74) *Attorney, Agent, or Firm*—Foley & Lardner LLP

(57) ABSTRACT

In an automotive air conditioner, there is provided an air guide arrangement for achieving an effective mixing between cooled air from an evaporator and warmed air from a heater under a bi-level mode. The air guide arrangement is placed in the vicinity of an outlet opening of a warmed air passage extending from the heater. The air guide arrangement forces a warmed air from the outlet opening of the warmed air passage to effectively mix with a cooled air which flows in a direction from the evaporator toward a ventilation air outlet opening.

6 Claims, 9 Drawing Sheets

WITHOUT AIR GUIDE

WITH AIR GUIDE

//AUTOMOTIVE AIR CONDITIONER

BACKGROUND OF THE INVENTION

1. Field of the Invention

The present invention relates in general to automotive air conditioners, and more particularly to the automotive air conditioners of a type that has a bi-level mode wherein conditioned air is blown out from both a ventilation air blow opening and a foot air blow opening at the same time. More specifically, the present invention is concerned with the automotive air conditioners that, under bi-level mode, can provide an air mixing chamber thereof with a unique mixing between cooled air and warmed air thereby permitting the ventilation air blow opening to blow out an air mass having a desired temperature.

2. Description of Related Art

In order to clarify the task of the present invention, one automotive air conditioner of a related art will be briefly described with reference to FIG. 10 of the accompanying drawings.

The automotive air conditioner 100 shown in the drawing is of the type having a bi-level mode, which comprises a unit case 101. Within the unit case 101, there are installed an evaporator 102, a heater 103 and an air mix door unit 104 which is arranged between the evaporator 102 and the heater 103.

The air mix door unit 104 is constructed to have a heater side passage 105 which allows air to flow from the evaporator 102 toward the heater 103, a bypass passage 106 which allows air to flow from the evaporator 102 directly to an air mix chamber 108, and an air distribution slide door 107 which distributes air from the evaporator 102 to the heater side passage 105 and bypass passage 106 at a controlled rate. A warmed air passage 113 extends from the heater 103 to the air mix chamber 108. Thus, under the bi-level mode of the air conditioner 100, in the air mix chamber 108, cooled air flowing from the evaporator through the bypass passage 106 and warmed air from the heater 103 through the warmed air passage 113 are mixed at a controlled ratio thereby to produce a temperature-controlled air in the air mix chamber 108. From the air mix chamber 103, there extend a ventilation air passage 109 and a foot air passage 110. Usually, the ventilation air passage 109 has outlets facing a vertically middle zone of a passenger room and the foot air passage 110 has outlets facing a lower zone of the passenger room. The ventilation and foot air passages 109 and 110 are equipped with pivoting control doors 111 and 112 respectively. Thus, by controlling the working angle of the control doors 111 and 112, a controlled amount of temperature-controlled air is blown into the passenger room from each of the outlets of the passages 109 and 110. The control door 112 is arranged and constructed to distribute the temperature-controlled air in the air mix chamber 108 to both the ventilation and foot air passages 109 and 110 at a controlled rate. For this controlling, the control door 112 pivots between a first position to close the foot air passage 110 while opening the ventilation air passage 109 and a second position to close the ventilation air passage 109 while opening the foot air passage 110. Under the bi-level mode, the control door 112 takes a halfway position between the first and second positions as shown. Thus, under this condition, the temperature-controlled air in the air mix chamber 108 can be led to both the ventilation and foot air passages 109 and 110.

However, due to an inherent construction, the air conditioner 100 has the following weak point. That is, as is seen from FIG. 4A of the accompanying drawings, under the bi-level mode, the control door 112 largely projects into the air mix chamber 108 as shown. Under such condition, cooled air from the evaporator 102 through the bypass passage 106 and warmed air from the heater 103 through the warmed air passage 113 are not effectively mixed in the air mix chamber 108 due to obstruction by the largely projected control door 112. In fact, due to such incomplete mixing in the air mix chamber 108, the ventilation air passage 109 tends to intake air mass whose temperature is cooler than a desired temperature and the foot air passage 110 tends to intake air mass whose temperature is higher than a desired temperature. This means that air blown into the passenger room from the ventilation air passage 109 and air blown into the passenger room from the foot air passage 110 have a remarkable temperature difference, which makes the passengers uncomfortable. This phenomenon becomes much severe when the size of the air mix chamber 108 is reduced.

SUMMARY OF THE INVENTION

It is therefore an object of the present invention to provide an automotive air conditioner which is free of the above-mentioned undesired phenomenon.

That is, according to the present invention, there is provided an automotive air conditioner which, under a bi-level mode, can feed respective given portions (viz., passenger chest and feet zones) of the passenger room with air masses which have a reduced temperature difference therebetween.

According to a first aspect of the present invention, there is provided an automotive air conditioner which comprises a case having an air inlet opening, a ventilation air outlet opening and a foot air outlet opening; an evaporator installed in the case; a heater installed in the case; an upstream air flow passage defined in the case and extending from the air inlet opening to the evaporator; an air mix chamber defined in the case, the air mix chamber having a downstream portion which is communicated with the ventilation air outlet and foot air outlet openings; a bypass passage extending from the evaporator to the air mix chamber bypassing the heater; a first heater passage extending from the evaporator to the heater; a second heater passage extending from the heater to the air mix chamber, the second heater passage having an outlet opening exposed to the air mix chamber; an air mix door unit installed in the case in such a manner as to vary a sectional area of at least the bypass passage; and an air guide arrangement provided at a position downstream of the air mix door unit, the air guide arrangement including a raised structure that extends across the bypass passage from a first position near the outlet opening of the second heater passage to a second position that is opposite to the first position with respect to the bypass passage.

According to a second aspect of the present invention, there is provided an automotive air conditioner which comprises a case having an air inlet opening, a ventilation air outlet opening and a foot air outlet opening; butterfly-type pivot doors respectively provided by the ventilation and foot air outlet openings, each pivot door having a center axis about which a valve proper rotates; an evaporator installed in the case; a heater installed in the case; an upstream air flow passage defined in the case and extending from the air inlet opening to the evaporator; an air mix chamber defined in the case, the air mix chamber having a downstream portion which is communicated with the ventilation air outlet and foot air outlet openings; a bypass passage extending from the evaporator to the air mix chamber bypassing the heater; a first heater passage extending from the evaporator to the heater; a second heater passage extending from the heater to the air mix chamber, the second heater passage having an outlet opening exposed to the air mix chamber; an air mix door unit installed in the case in such a manner as to vary a sectional area of both the bypass passage and the first heater passage; and an air guide arrangement provided at a position downstream of the air mix door unit, the air guide arrangement including a raised structure that extends across the bypass passage from a first position near the outlet opening of the second heater passage to a second position that is opposite to the first position with respect to the bypass passage, so that the raised structure of the air guide arrangement forces a first air flow from the outlet opening of the second heater passage to mix with a second air flow which runs in a direction from the bypass passage toward the ventilation air outlet opening.

BRIEF DESCRIPTION OF THE DRAWINGS

Other objects and advantages of the present invention will become apparent from the following description when taken in conjunction with the accompanying drawings, in which.

DETAILED DESCRIPTION OF EMBODIMENTS

In the following, various embodiments of the present invention will be described in detail with reference to the accompanying drawings.

For ease of description, substantially same parts and constructions of the embodiments are denoted by the same numerals and repeated explanations of such parts and constructions will be emitted from the following.

Furthermore, for ease of understanding, various directional terms, such as, right, left, upper, lower, rightward, etc., are included in the following description. However, such terms are to be understood with respect to only a drawing or drawings on which the corresponding part or portion is illustrated.

Figure 1:
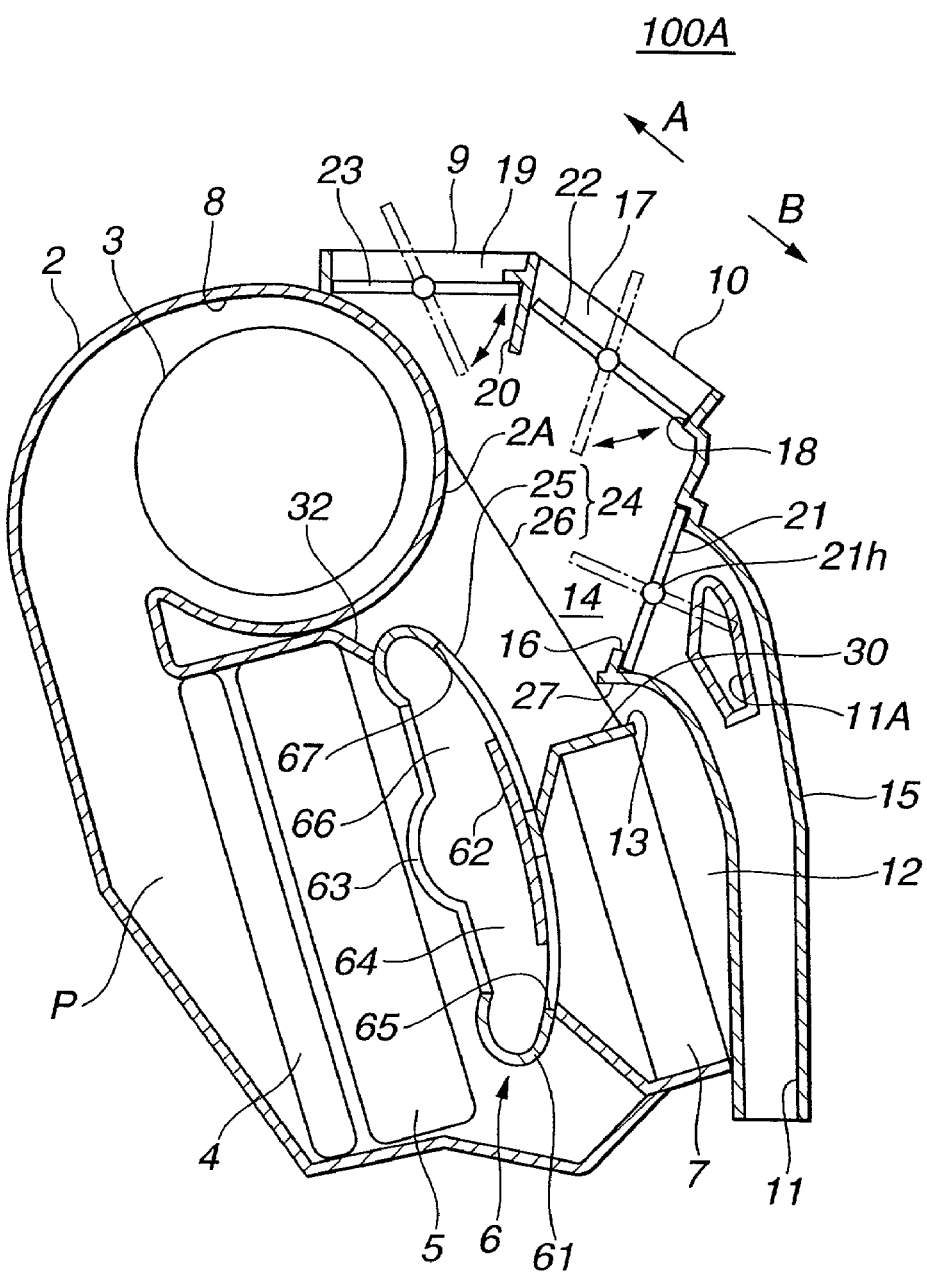
FIG. 1 is a vertically sectional view of an automotive air conditioner which is a first embodiment of the present invention.

Referring to FIG. 1 to FIG. 5B, especially FIG. 1, there is shown an automotive air conditioner 100A which is a first embodiment of the present invention.

As is seen from FIG. 1, the automotive air conditioner 100A of the first embodiment comprises a unit case 2, an electric fan 3 installed at an upstream part in the unit case 2, an air filter 4 positioned downstream of the fan 3, an evaporator 5 positioned just downstream of the air filter 4, an air mix door unit 6 and a heater 7.

The unit case 2 is constructed to have an air flow passage "P" defined therein. At a position upstream of the electric fan 3, the case 2 has an air inlet opening (not shown) through which outside air and/or inside air (viz., air in a passenger room) is led into the passage "P" by the fan 3. At a downstream part of the air flow passage "P", there are provided a defroster air outlet opening 9, a ventilation air outlet opening 10 and a foot air outlet opening 11. As shown, the openings 9 and 10 are provided at a rear upper portion of the unit case 2, while the opening 11 is provided at a rear lower portion of the case 2. More specifically, the opening 11 is formed at a leading end of a duct structure 15 which extends downward in the case 2. Denoted by numeral 11A is an inlet opening of a branch duct which extends to another given lower portion from the duct structure 15.

The defroster air outlet opening 9 is directed to an inner surface of a windshield (not shown) of an associated motor vehicle, and the ventilation air outlet opening 10 is connected to both a center ventilation duct (not shown) that blows air toward a chest zone of passengers and side ventilation ducts (not shown) that blow air toward side window panes of the vehicle. The foot air outlet opening 11 is connected to both a front foot duct (not shown) that blows air toward a foot area of front passengers and a rear foot duct (not shown) that blows air toward a foot area of rear passengers.

The electric fan 3 is located at the upstream part 8 of the air flow passage "P" to drive the inputted air downstream in the passage "P".

The air filter 4 filters out dusts from air flowing in the air flow passage "P". Due to this air filter 4, cleaned air is led into the passenger room and at the same time, heat exchanging fins of the evaporator 5 and those of the heater 7 are protected from ducts and thus the performance of these devices 5 and 7 is kept good for a longer time.

The evaporator 5 is an element of a cooling system, through which a refrigerant flows for cooling air flowing through the evaporator 5. The heater 7 is fed with an engine cooling water from a water jacket of an associated engine of the vehicle. Thus, the heater 7 warms air flowing therethrough.

The air mix door unit 6 is arranged between the evaporator 5 and the heater 7 and comprises a door case 61 and a slide door 62 slidably disposed on the door case 61. The door case 61 has an air inlet aperture 63 which faces a rear surface of the evaporator 5, a lower (or first) air outlet opening 65 which faces a front surface of the heater 7 and an upper (or second) air outlet opening 67 which faces toward an after-mentioned air mix chamber 14. The lower air outlet opening 65 forms part of a heater side passage 64 which extends from the evaporator 5 to the heater 7, and the upper air outlet openings 67 forms part of a bypass passage 66 which extends from the evaporator 5 to the air mix chamber 14 bypassing the heater 7. As shown, a warmed air passage 12 extends upward from the heater 7 to the air mix chamber 14. The slide door 62 slides generally vertically along a given way to vary the open degree of the outlet openings 65 and 67 distributing a cooled air from the evaporator 5 to the heater side passage 64 and bypass passage 66 at a controlled rate.

As shown, the heater 7 is positioned near the lower air outlet opening 65. The heater 7 has an upper end held by a holding lib 30 which is projected from the door case 61. The warmed air passage 12 extends upward along the duct structure 15 that has the foot air outlet opening 11.

As is shown, an outlet opening 13 of the warmed air passage 12 is directed toward the air outlet opening 67 of the bypass passage 66. It is to be noted that the outlet opening 13 and the outlet opening 67 are both exposed to the air mix chamber 14 where cooled air from the bypass passage 64 and the warmed air from the warmed air passage 12 are mixed to provide a temperature-controlled air in the air mix chamber 14.

Just above the outlet opening 13, there is defined an inlet opening 16 of the duct structure 15 of the foot air outlet opening 11. Just above the inlet opening 16, there is defined an inlet opening 18 of a ventilation air passage 17 that is connected to the ventilation air outlet opening 10, and at a front upper position of the inlet opening 18, there is defined an inlet opening 20 of a defroster air passage 19 that is connected to the defroster air outlet opening 9.

As shown, the inlet openings 16, 18 and 20 of the air passages 15, 17 and 19 are respectively provided with pivot doors 21, 22 and 23 of a butterfly type. For ease of understanding, these doors 21, 22 and 23 will be called foot door, ventilation door and defroster door respectively. Although not shown in the drawings, these doors 21, 22 and 23 are pivotally actuated by an electric actuator when mode setting and temperature setting knobs on an instrument panel are manipulated.

In the first embodiment 100A of the present invention, the following constructional features are provided.

As is seen from FIG. 1, the foot door 21 is pivotal about its center pivot axis 21h and so arranged as to pivot between a closed position to close the inlet opening 16 of the foot air passage 15 and an open position to open the inlet opening 16. As shown, in the closed position, upper and lower ends of the foot door 21 abut against projections (no numerals) formed on a peripheral portion of the inlet opening 16, while, in the open position, the opposed side parts, viz., the upper and lower ends of the door 21 are projected but slightly into the air mix chamber 14 and the foot air passage 15 respectively. The upper and lower ends of the foot door 21 serve as means for limiting pivoting movement of the foot door 21 in the air mix chamber 14.

As is seen from FIGS. 1 and 2, behind the air outlet opening 67 of the bypass passage 66, there is provided a vertically extending air guide 24 which projects into the air mix chamber 14. That is, as is seen from FIG. 2, the air guide 24 is located at a laterally middle portion of the outlet opening 67, extending vertically from the holding lib 30 to an inside case wall 2A that defines the upstream part 8 of the air flow passage "P".

Figure 2A:
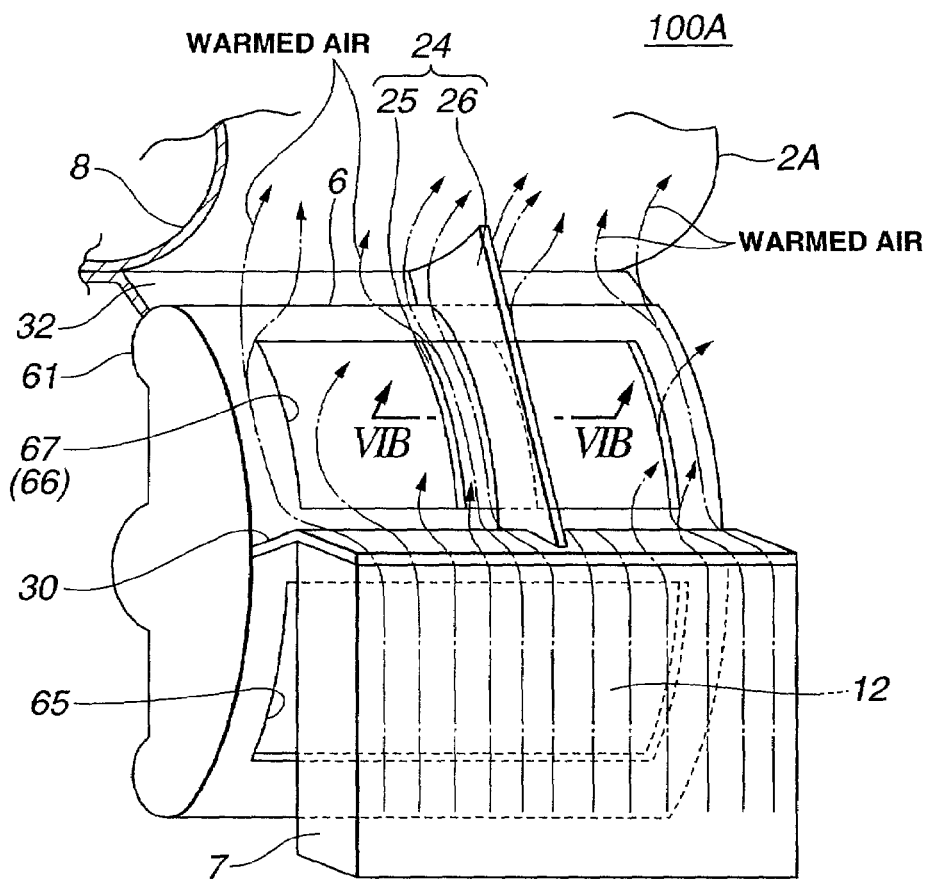
FIG. 2A is a perspective view of an area of the air conditioner of the first embodiment where an air mix chamber is provided.
Figure 2B:
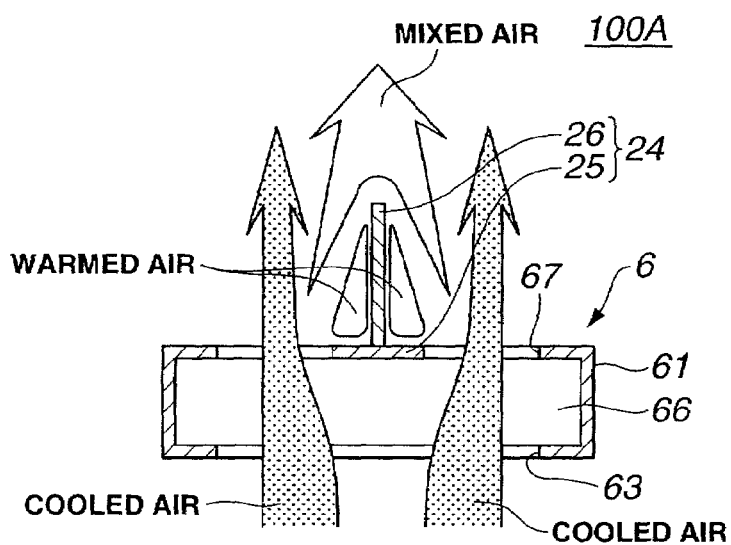
FIG. 2B is a schematically illustrated sectional view taken along the line IIB—IIB of FIG. 2A.

More specifically, as will be seen from FIGS. 2A and 2B, the air guide 24 is constructed to have a generally T-shaped cross section, comprising an elongate base plate 25 that extends vertically across the upper air outlet opening 67 and a baffle plate 26 that is perpendicularly raised from a laterally middle portion of the base plate 25 into the air mix chamber 14. The air guide 24 may be a part integral with the door case 61.

As is seen from FIGS. 2A and 2B, due to provision of the baffle plate 26, cooled air flow from the evaporator 5 from the bypass passage 66 is separated into two flows.

Furthermore, as is seen from FIG. 2A, between the inside case wall 2A of the case 2 and an upper wall of the door case 61, there laterally extends an elongate plate portion. With this plate portion, there is formed a laterally extending recess 32 which faces the air mix chamber 14. A laterally middle portion of the recess 32 has an upper end of the baffle plate 26 mounted thereon, as shown. As will be seen from FIGS. 1 and 2A, under operation of the air conditioner 100A, warmed air from the warmed air passage 12 is guided by the baffle plate 26 and then diffused by the recess 32 in lateral directions.

Figure 4A:
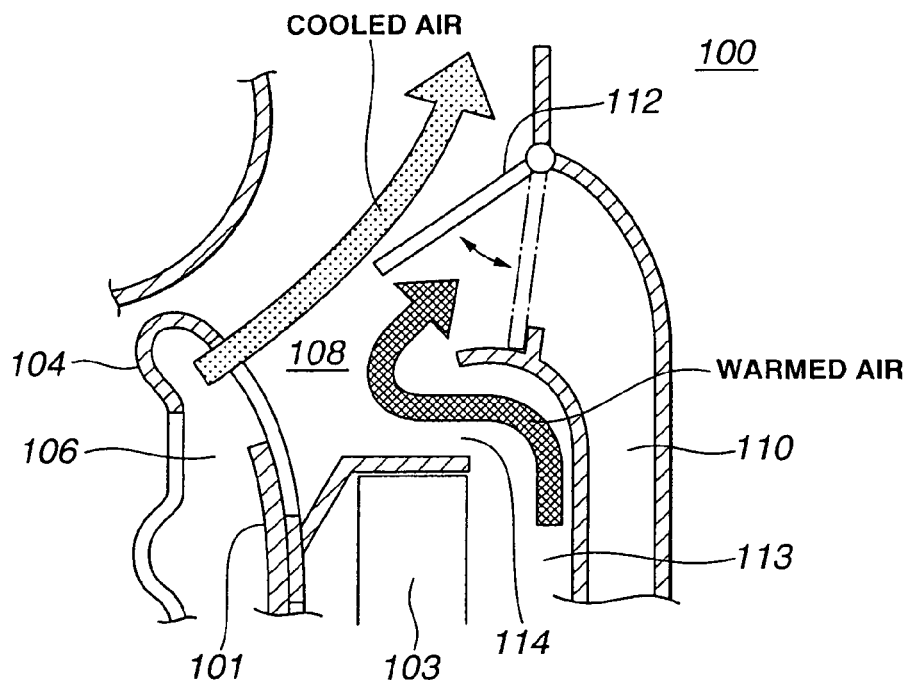
FIG. 4A is a schematically illustrated sectional view of the air conditioner of the related art, showing air flow in the air mix chamber.
Figure 4B:
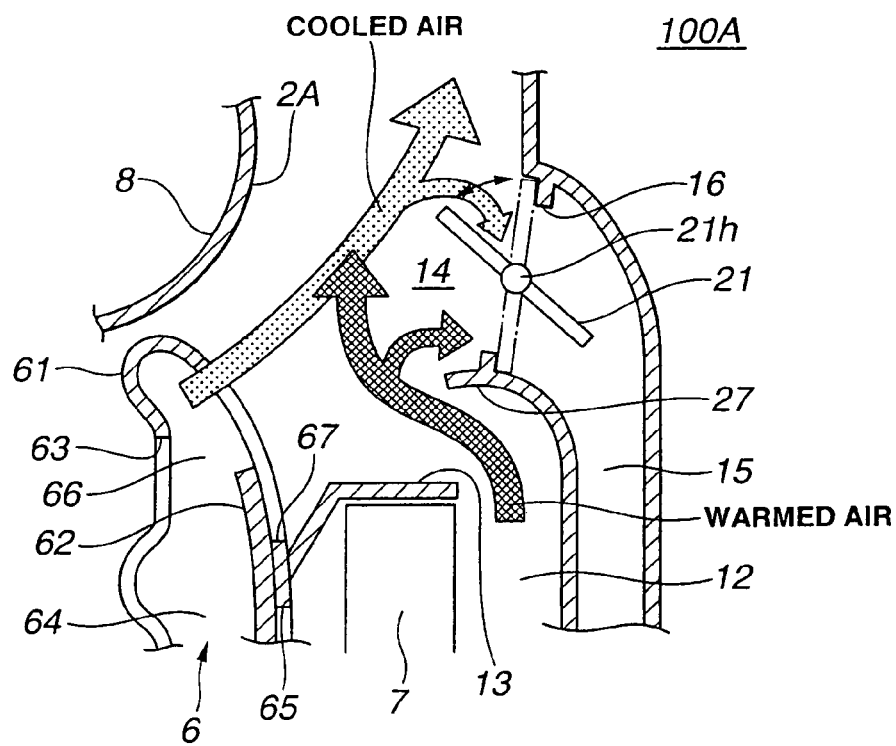
FIG. 4B is a view similar to FIG. 4A, but showing air flow in the first embodiment of the present invention.

Furthermore, as is seen from FIGS. 1 and 4B, in the first embodiment 100A, an air guide opening 27 is formed on the outlet end of the warmed air passage 12, which is bent toward the air guide 24. More specifically, the air guide opening 27 comprises a gently curved upper inner wall of the outlet end of the warmed air passage 12.

In the following, advantageous phenomena of the first embodiment 100A having the above-mentioned constructional features will be described in the following.

Figure 10:
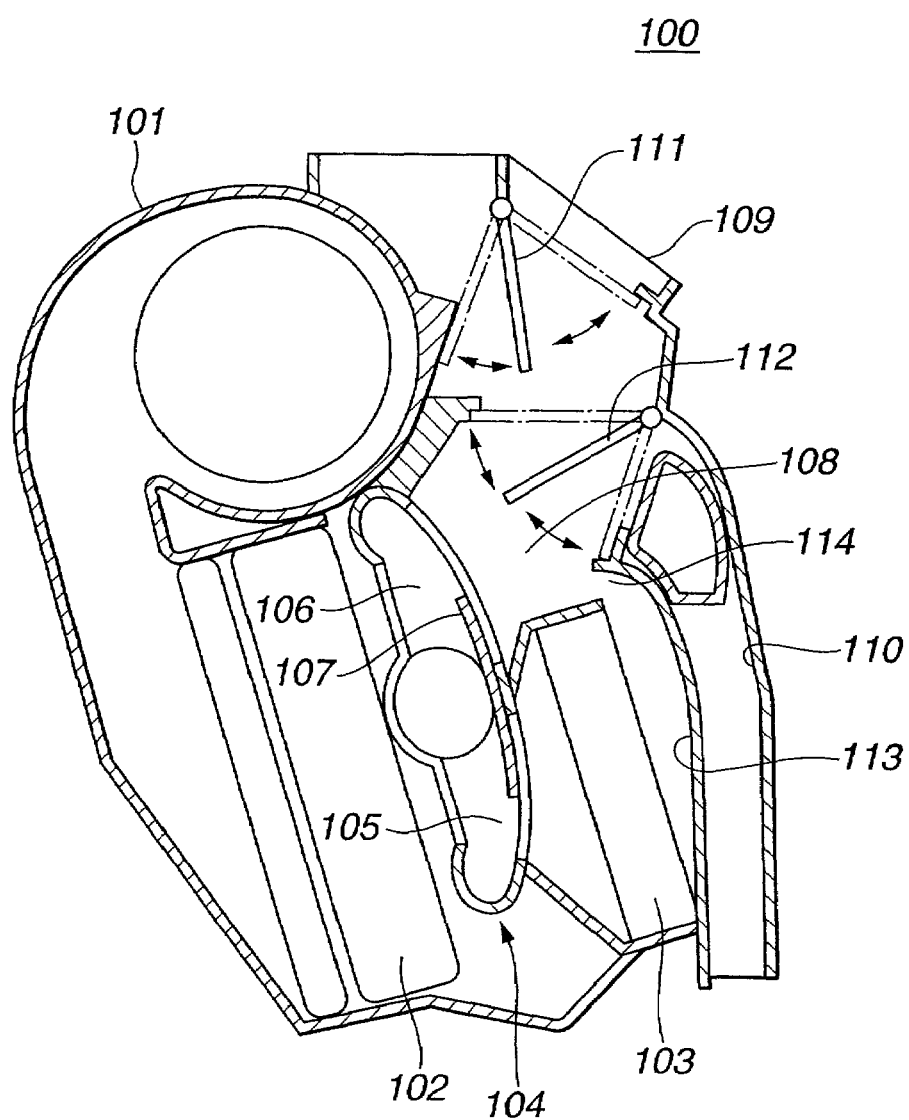
FIG. 10 is a vertically sectional view of an automotive air conditioner of a related art.

First, as is understood from FIG. 4B, the foot door 21 is of a butterfly type arranged to pivot about its center pivot axis 21h. This means that the foot door 21 projects into the air mix chamber 14 in a small degree as compared with in case of the related art of FIG. 4A wherein the foot door 112 (see FIG. 10) is pivoted about an upper end thereof. Thus, when the automotive air conditioner 100A assumes bi-level mode wherein the foot door 21 takes a half-open position as shown in FIG. 4B, the cooled air from the bypass passage 66 and the warmed air from the warmed air passage 12 are effectively mixed in the air mix chamber 14. That is, in the first embodiment 100A of the invention, air mass blown out from the ventilation air passage 17 and that blown out from the foot air passage 15 can have a less temperature difference, which makes the passengers comfortable.

For investigating the above-mentioned advantage of the invention, an experiment was carried out by the applicants by using the air conditioner 100 of FIG. 4A of the related art and the air conditioner 100A of the first embodiment of the invention. In the experiment, in each of the air conditioners 100 and 100A, the temperature of air blown out from the foot air passage 110 or 11 and that of air from the ventilation air passage 109 or 10 were measured with respect to the open degree of the foot door 112 or 21.

Figure 5A:
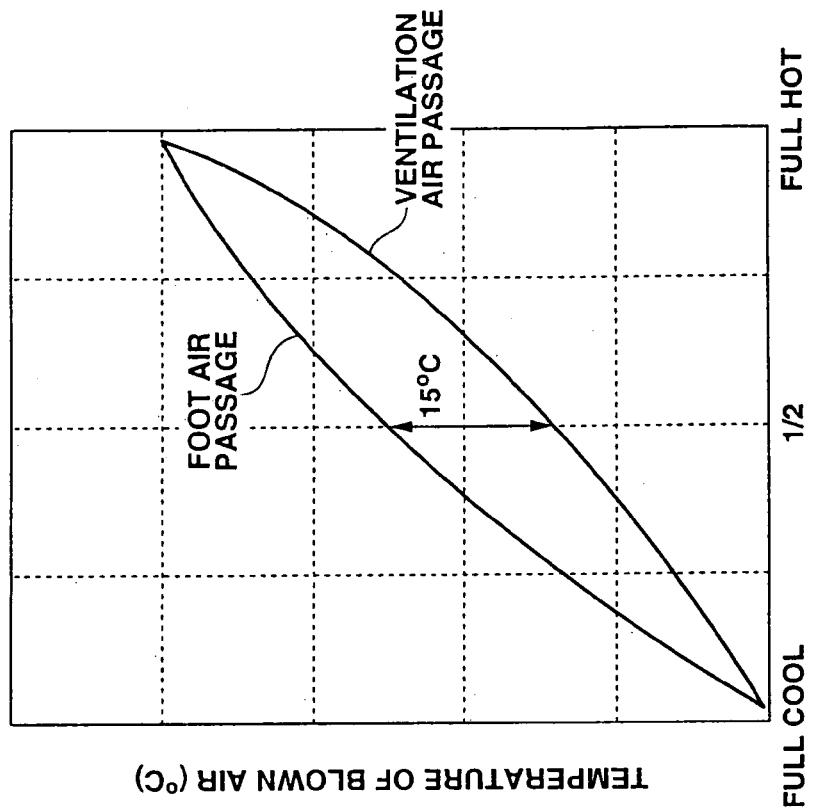
FIG. 5A is a graph showing the air temperature in a foot air blow opening and that in a ventilation air blow opening under a bi-level mode in case of the air conditioner of the related art.
Figure 5B:
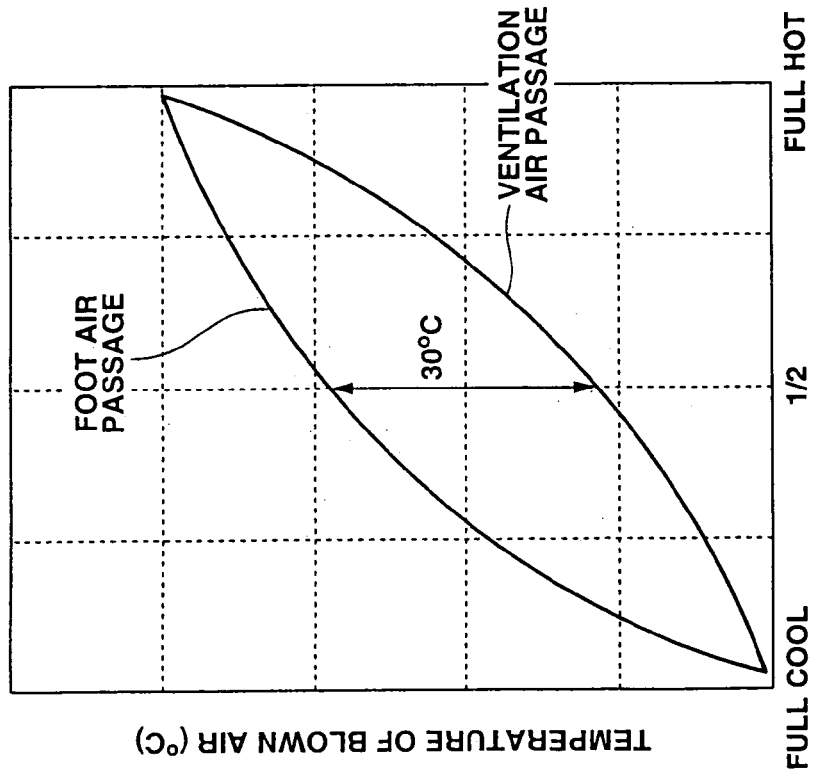
FIG. 5B is a graph similar to FIG. 5A, but showing the air temperature in case of the first embodiment of the present invention.

Results of the experiment are depicted in the graphs of FIGS. 5A and 5B. As is seen from these graphs, the first embodiment 100A showed only 15 C.° as the largest temperature difference while the related art 100 showed 30 C.° as the difference. In fact, it occurred that, under a same bi-level mode, the air mass from the foot air passage 110 and that from the ventilation air passage 109 of the related art 100 showed 45 C.° and 15 C.° respectively (viz., temperature difference is 30 C.°) in case of the related art 100, while in case of the first embodiment 100A, corresponding air masses showed 40 C.° and 16 C.° respectively (viz., temperature difference is 24 C.°).

Second, as is seen from FIG. 2, due to provision of the air guide 24, the warmed air from the warmed air passage 12 is forced to flow in the air mix chamber 14 in such a manner as is indicated by arrows. That is, due to provision of the air guide 24, the warmed air can be led to the upper portion of the air mix chamber 14, and thus, as is seen from FIG. 1, the mass of warmed air becomes to have a higher possibility of being blown toward the ventilation air outlet opening 10 by the cooled air from the bypass passage 66. Thus, the above-mentioned temperature difference is much reduced. As is seen from FIG. 2B, due to interference by the base plate 25 of the air guide 24, the mass of cooled air is enforcedly separated into two flows helping the upward flow of the warmed air in the air mix chamber 14, which promotes the reducing of the above-mentioned temperature difference.

As is seen from FIGS. 1 and 2A, due to provision of the laterally extending recess 32 defined between the inside case wall 2A and the upper wall of the door case 61, the warmed air running upward along the baffle plate 26 is guided laterally outward, which also promotes the reducing of the above-mentioned temperature difference.

In order to investigate the advantageous function of the air guide 24 in the first embodiment 100A under the bi-level mode, an experiment was carried out.

This experiment will be described with reference to FIGS. 3A and 3B, which depict a temperature distribution of air mass flowing in the ventilation air blow opening of tested air conditioners. In each drawing, denoted by numeral 10a is a center blow opening, and denoted by numeral 10b are side blow openings.

Figure 3A:
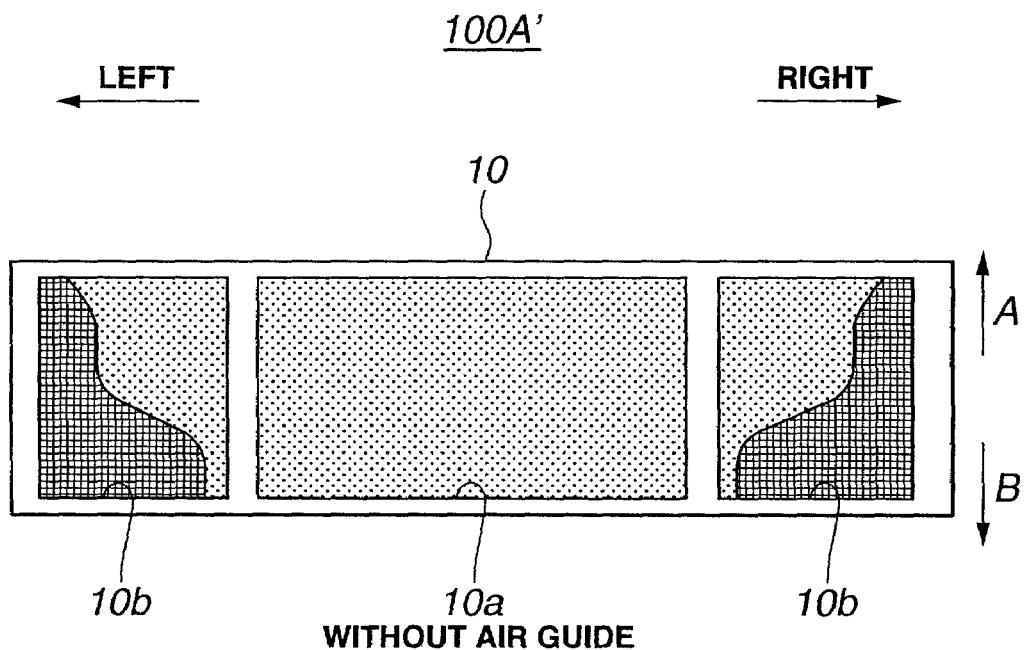
FIG. 3A is a sectional view of ventilation air blow opening of an air conditioner with an air guide removed, showing a temperature distribution possessed by the air flow in the opening.
Figure 3B:
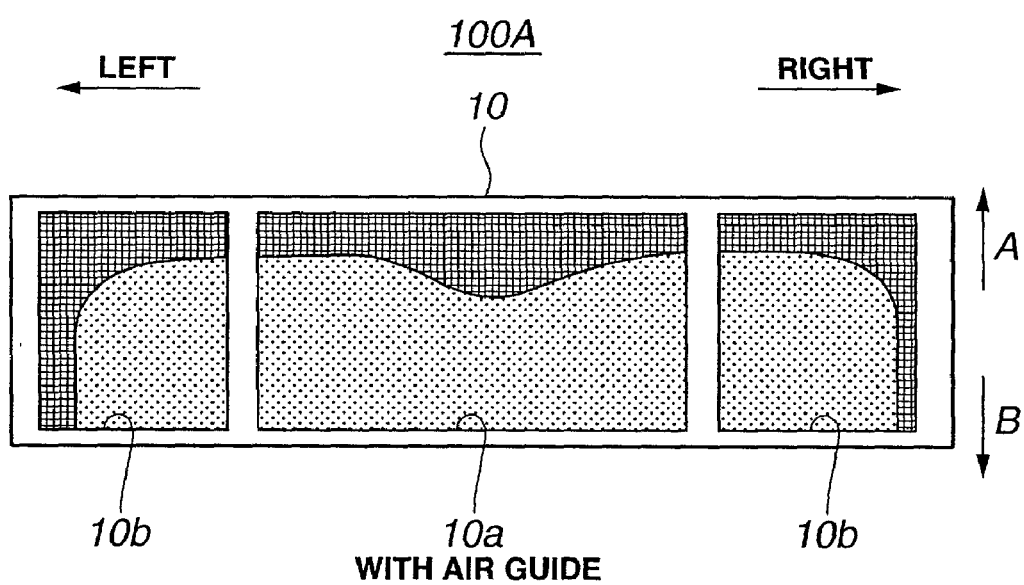
FIG. 3B is a view similar to FIG. 3A, but showing a temperature distribution in case of the first embodiment.

In the experiment, two types of air conditioners were used, one being a type 100A' of FIG. 3A having no air guide and the other being a type 100A of FIG. 3B having the air guide 24.

As is seen from FIG. 3B, in the type 100A of the first embodiment, the warmed air was seen to flow along an upper zone "A" in the ventilation air outlet opening 10. This proves that under such bi-level mode, the warmed air from the warmed air passage 12 (see FIG. 1) is subjected to a course change and directed toward the ventilation air outlet opening 10. In other words, with the provision of the air guide 24, the cooled air from the bypass passage 66 and the warmed air from the warmed air passage 12 are approximately or uniquely mixed in the air mix chamber 14. While, in case of the type 100A' having no air guide, the warmed air was seen to flow along side walls of the air outlet opening 10 exclusively. The temperature distribution shown in the ventilation air outlet opening 10 is changed or controlled by varying the size, length and position of the air guide 24.

In the first embodiment 100A, the air guide opening 27 is provided, which is constructed to face the air guide 24, and thus, the warmed air from the warmed air passage 12 is assuredly guided by the air guide 24.

Figure 6A:
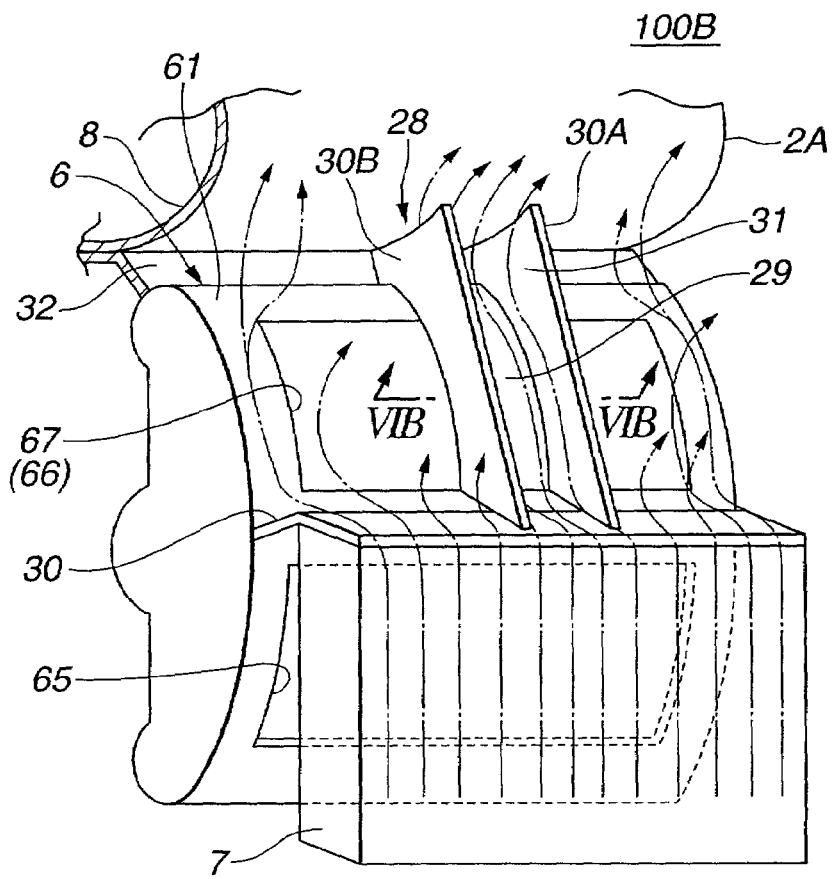
FIG. 6A is a view similar to FIG. 2A, but an automotive air conditioner of a second embodiment of the present invention.
Figure 6B:
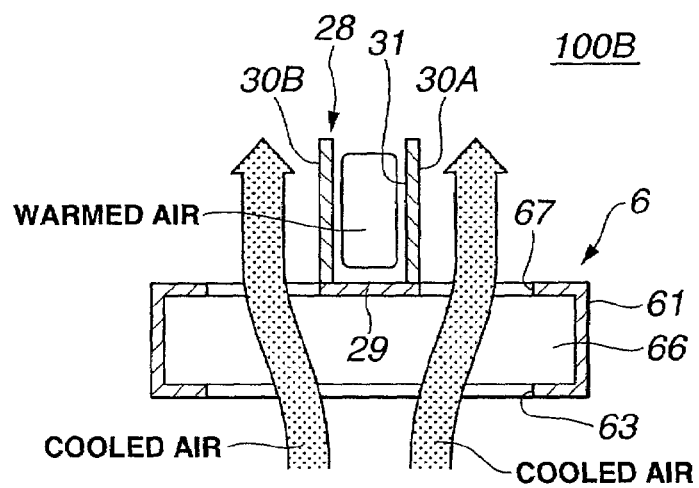
FIG. 6B is a schematically illustrated sectional view taken along the line VIB—VIB of FIG. 6A.

Referring to FIGS. 6A and 6B, especially FIG. 6A, there is shown an automotive air conditioner 100B which is a second embodiment of the present invention.

Since the conditioner 100B of this second embodiment is similar to that 100A of the above-mentioned first embodiment, only parts or portions which are different from those of the first embodiment 100A will be described in detail in the following for ease of description. Substantially same parts and portions as those of the first embodiment 100A are denoted by the same numerals.

As is seen from FIG. 6A, in the second embodiment 100B, an air guide 28 of a channel-shape is used, which is mounted behind the air outlet opening 67 of the bypass passage 66. More specifically, the air guide 28 comprises an elongate base plate 29 that extends vertically across the upper air outlet opening 67 and two baffle plates 30A and 30B which are raised from lateral ends of the base plate 28 into the air mix chamber 14. Thus, between the two baffle plates 30A and 30B, there is defined a warmed air guide groove 31.

As is seen from FIG. 6A, due to the air guide groove 31 provided by the air guide 28, the warmed air from a laterally middle portion of an outlet opening of the warmed air passage 12 is enforcedly led into the air guide groove 31, and thus, led into an upper portion of the air mix chamber 14 (see FIG. 1). Thus, the mass of warmed air directed toward the ventilation air outlet opening 10 is increased thereby reducing the above-mentioned temperature difference between air blown from the ventilation air passage 17 and air blown form the foot air passage 15.

Figure 7A:
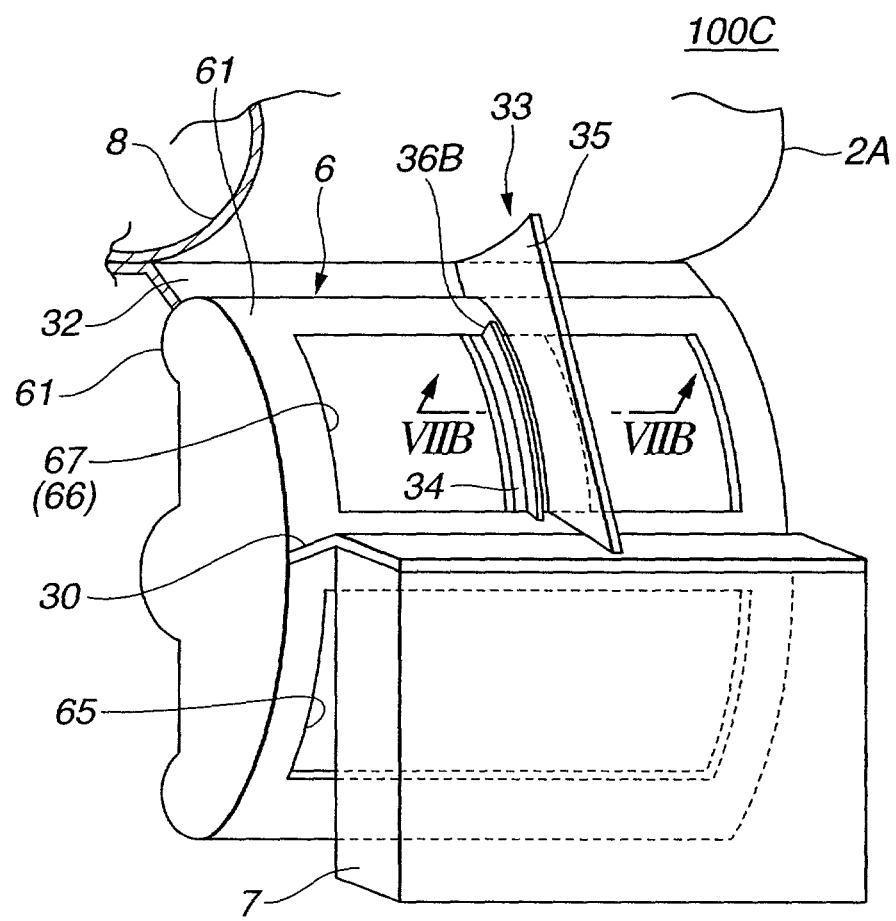
FIG. 7A is a view similar to FIG. 2A, but showing an automotive air conditioner of a third embodiment of the present invention.
Figure 7B:
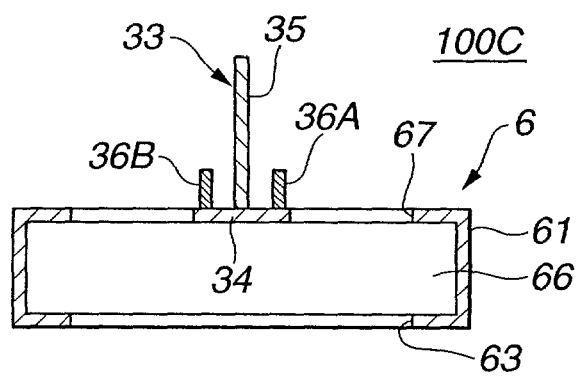
FIG. 7B is a schematically illustrated sectional view taken along the line VIIB—VIIB of FIG. 7A.

Referring to FIGS. 7A and 7B, especially FIG. 7A, there is shown an automotive air conditioner 100C which is a third embodiment of the present invention.

Since the conditioner 100C of this third embodiment is also similar to that 100A of the above-mentioned first embodiment, only parts or portions which are different from those of the first embodiment 100A will be described.

As is seen from FIGS. 7A and 7B, in the third embodiment 100C, an air guide 33 having an anchor-shaped cross section is used, which is mounted behind the air outlet opening 67 of the bypass passage 66. More specifically, the air guide 33 comprises an elongate base plate 34 that extends vertically across the upper air outlet opening 67, a center major baffle plate 35 that is raised from a laterally middle portion of the base plate 34 and two smaller baffle plates 36A and 36B that are raised from lateral end portions of the base plate 34. In the illustrated embodiment, the smaller baffle plates 36A and 36B have each a length that is substantially the same as the length of the upper air outlet opening 67.

In the third embodiment 100C, two air guide grooves (no numerals) are provided at either sides of the major baffle plate 35. Due to the air guide grooves provided by the air guide 33, upward flow of the warmed air from the warmed air passage 12 is smoothed or enhanced, and thus, like in the above-mentioned second embodiment 100B, the mass of warmed air directed toward the ventilation air outlet opening 10 (see FIG. 1) is increased, and thus, the above-mentioned temperature difference between the ventilation air passage 17 and the foot air passage 15 is reduced.

Figure 8:
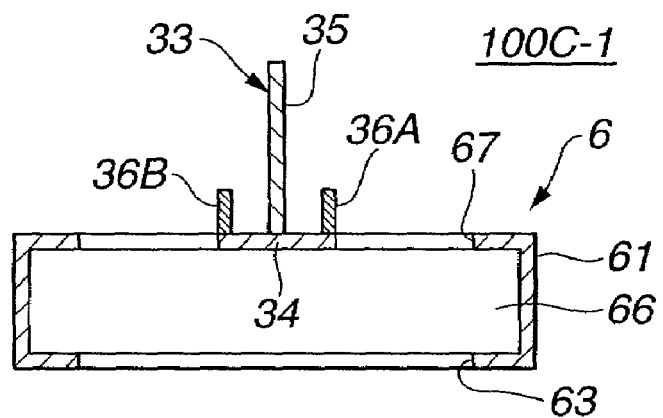
FIG. 8 is a view similar to FIG. 7B, but showing a first modification of the third embodiment of the present invention.
Figure 9:
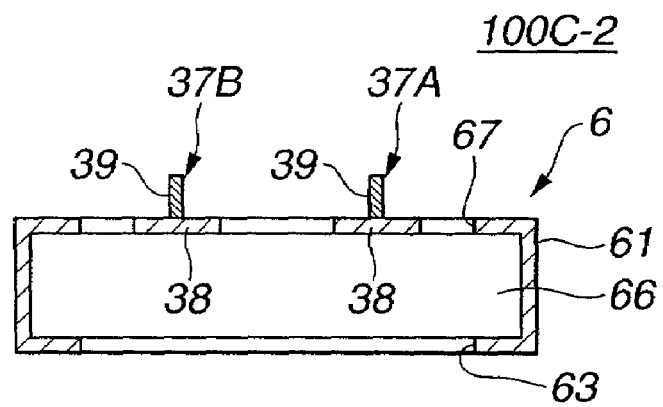
FIG. 9 is a view also similar to FIG. 7B, but showing a second modification of the third embodiment of the present invention.

If desired, the third embodiment 100C may be modified like first and second modifications 100C-1 and 100C-2 which are shown in FIGS. 8 and 9 respectively. That is, in the first modification 100C-1 of FIG. 8, the two smaller baffle plates 36A and 36B are raised from lateral ends of the base plate 34. In the second modification 100C-2 of FIG. 9, two air guides 37A and 37B are used, which are arranged abreast behind the air outlet opening 67 of the bypass passage 66. Each air guide 37A comprises an elongate base plate 38 that extends vertically across the opening 67 and a smaller baffle plate 39 that is raised from a laterally middle portion of the base plate 38.

The entire contents of Japanese Patent Application 2001-076991 filed Mar. 16, 2001 are incorporated herein by reference.

Although the invention has been described above with reference to the embodiments of the invention, the invention is not limited to such embodiments as described above.

Various modifications and variations of such embodiments may be carried out by those skilled in the art, in light of the above description.

What is claimed is:

1. An automotive air conditioner comprising:
    a case having an air inlet opening, a ventilation air outlet opening and a foot air outlet opening;
    an evaporator installed in said case;
    a heater installed in said case;
    an upstream air flow passage defined in said case and extending from said air inlet opening to said evaporator;
    an air mix chamber defined in said case, said air mix chamber having a downstream portion which is communicated with said ventilation air outlet and foot air outlet openings;
    a bypass passage extending from said evaporator to said air mix chamber bypassing said heater;
    a first heater passage extending from said evaporator to said heater;
    a second heater passage extending from said heater to said air mix chamber, said second heater passage having an outlet opening exposed to said air mix chamber;
    an air mix door unit installed in said case in such a manner as to vary a sectional area of at least said bypass passage;
    an air guide arrangement provided at a position downstream of said air mix door unit, said air guide arrangement including a raised structure that extends across said bypass passage from a first position near said outlet opening of said second heater passage to a second position that is opposite to said first position with respect to said bypass passage; and
    a laterally extending recess formed adjacent to said air mix door unit and which extends across said case and which faces said air mix chamber,
    wherein said air guide structure comprises:
        an elongate base plate which extends across said bypass passage; and
        a baffle plate which is raised from a middle portion of said base plate into said air mix chamber,
    wherein an upper end of said baffle plate is mounted onto a middle portion of said laterally extending recess with respect to a horizontal direction at a position substantially less than the distance to said ventilation outlet opening of said casing to thereby enhance mixing in said air mix chamber,
    wherein said air mix door unit is arranged to vary a sectional area of both said bypass passage and said first heater passage,
    wherein said air mix door unit comprises:
        a door case having an air inlet aperture facing said evaporator, a first outlet opening merged with said first heater passage and a second outlet opening merged with said bypass passage; and
        a slide door slidable relative to said door case to vary the open degree of said first and second outlet openings, and
    wherein said air guide arrangement comprises:
        an air guide structure which extends across said bypass passage in the vicinity of said second outlet opening of said air mix door unit; and
        an air guide opening formed on the outlet end of said second heater passage, said air guide opening being directed toward said air guide structure.

2. An automotive air conditioner as claimed in claim 1, wherein only one said air mix door unit is provided in said bypass passage.

3. An automotive air conditioner as claimed in claim 1, wherein said air guide structure is mounted to a rear wall of said door case to divide said second outlet opening into abreast arranged two open portions.

4. An automotive air conditioner as claimed in claim 1, wherein the raised structure of said air guide arrangement is arranged to force an air flow from said outlet opening of said second heater passage to mix with an air flow which runs in a direction from said bypass toward said ventilation air outlet opening.

5. An automotive air conditioner as claimed in claim 1, wherein said ventilation air outlet and foot air outlet openings of said case are respectively equipped with pivot doors of butterfly type, each pivot door being pivotal about an axis which passes through a middle portion of the pivot door.

6. An automotive air conditioner as claimed in claim 5, in wherein said foot air outlet opening is equipped with a door stopper which stops an excessive pivoting of the corresponding pivot door in said air mix chamber.

* * * * *